(12) United States Patent
Suzuki

(10) Patent No.: US 11,463,379 B2
(45) Date of Patent: Oct. 4, 2022

(54) INFORMATION PROCESSING SYSTEM, INFORMATION PROCESSING APPARATUS, AND NON-TRANSITORY COMPUTER-READABLE RECORDING MEDIUM STORING THEREIN INFORMATION PROCESSING PROGRAM

(71) Applicant: FUJITSU LIMITED, Kawasaki (JP)

(72) Inventor: Kazuhiro Suzuki, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 80 days.

(21) Appl. No.: 16/884,114

(22) Filed: May 27, 2020

(65) Prior Publication Data

US 2020/0403937 A1 Dec. 24, 2020

(30) Foreign Application Priority Data

Jun. 19, 2019 (JP) .............................. JP2019-113801

(51) Int. Cl.
*H04L 12/931* (2013.01)
*H04L 49/20* (2022.01)
(52) U.S. Cl.
CPC .................................. *H04L 49/208* (2013.01)
(58) Field of Classification Search
CPC ................................................... H04L 49/208
See application file for complete search history.

(56) References Cited

U.S. PATENT DOCUMENTS

| 11,134,523 | B2 * | 9/2021 | Jiang | ................. H04W 72/0446 |
| 2015/0370586 | A1 | 12/2015 | Cooper et al. | |
| 2018/0205575 | A1 | 7/2018 | Tian | |
| 2018/0349163 | A1 * | 12/2018 | Gao | .................... H04L 12/4641 |
| 2020/0213246 | A1 * | 7/2020 | Pan | ................... G06F 15/17331 |

FOREIGN PATENT DOCUMENTS

| JP | 2017-22767 A | 1/2017 |
| JP | 2018-528725 A | 9/2018 |

* cited by examiner

*Primary Examiner* — Luat Phung
(74) *Attorney, Agent, or Firm* — Fujitsu Patent Center

(57) ABSTRACT

An information processing apparatus includes: a memory that stores association information associating a first address of a first container assigned beforehand with a second address of a second container assigned beforehand; and a processor coupled to the memory. The processor detects first information from one of containers; sets, when the address in the first information matches the first or second address, the container including the matching address and a port of a virtual machine specified by the first information in association with each other in the association information; duplicates second information passing through a first port associated with the first container by referring to the association information; and forwards the duplicated second information destined for a second port associated with the second container.

18 Claims, 21 Drawing Sheets

EXAMPLE OF SERVER-BASED VIRTUALIZATION

EXAMPLE OF CONTAINER-BASED VIRTUALIZATION

FIG.10

EXAMPLE OF VM MIRRORING
MANAGEMENT TABLE  ~73

| ID | NAME | PORT ID | MIRRORING DIRECTION | MONITORED PORT ID |
|---|---|---|---|---|
| 1 | VM1_eth0 | PortA | BIDIRECTION | CONTAINER A |
| 2 | VM2_eth0 | PortB | OUTPUT | CONTAINER B |
| 3 | VM2_eth1 | PortC | INPUT | CONTAINER C |
| ⋮ | ⋮ | ⋮ | ⋮ | ⋮ |

FIG.11

EXAMPLE OF INITIAL STATE OF CONTAINER
MIRRORING MANAGEMENT TABLE ~32

| ID | TARGET ADDRESS | TARGET PORT ID | MIRRORING DIRECTION | DESTINATION ADDRESS | DESTINATION PORT ID |
|----|----------------|----------------|---------------------|---------------------|---------------------|
| 1  | CONTAINER A    | –              | BIDIRECTION         | CONTAINER A         | –                   |
| 2  | CONTAINER B    | –              | OUTPUT              | CONTAINER B         | –                   |
| 3  | CONTAINER C    | –              | INPUT               | CONTAINER C         | –                   |
| ⋮  | ⋮              | ⋮              | ⋮                   | ⋮                   | ⋮                   |

EXAMPLE OF PORT MIRRORING OF EMBODIMENT

FIG.13

EXAMPLE OF CONTAINER MIRRORING
MANAGEMENT TABLE ~32

| ID | TARGET ADDRESS | TARGET PORT ID | MIRRORING DIRECTION | DESTINATION ADDRESS | DESTINATION PORT ID |
|---|---|---|---|---|---|
| 1 | CONTAINER A | PortA | BIDIRECTION | CONTAINER m | PortM |
| 2 | CONTAINER B | PortA | OUTPUT | CONTAINER m | PortM |
| 3 | CONTAINER C | PortF | INPUT | CONTAINER x | PortX |
| ⋮ | ⋮ | ⋮ | ⋮ | ⋮ | ⋮ |

EXAMPLE OF ENCAPSULATED MIRROR PACKET

INFORMATION PROCESSING SYSTEM, INFORMATION PROCESSING APPARATUS, AND NON-TRANSITORY COMPUTER-READABLE RECORDING MEDIUM STORING THEREIN INFORMATION PROCESSING PROGRAM

CROSS-REFERENCE TO RELATED APPLICATION

This application is based upon and claims the benefit of priority of the prior Japanese Patent application No. 2019-113801, filed on Jun. 19, 2019, the entire contents of which are incorporated herein by reference.

FIELD

The embodiment discussed herein relates to an information processing system, an information processing apparatus, and a non-transitory computer-readable recording medium storing therein an information processing program.

BACKGROUND

A virtual machine (VM) that is provided as a virtual server using physical hardware (HW) resources of one or more information processing apparatuses has been known. Packet capture is known as a scheme for monitoring a virtual machine or the like.

One embodiment of packet capture is port mirroring. Port mirroring is the process of mirroring an ingress packet into a VM, an egress packet, or both the packets passing through a port of a virtual switch on a host to another port. For example, when processing on a packet at a port is completed, the virtual switch duplicates the packet to generate a mirror packet, and transmits the mirror packet to another port.

As an example of a virtualization technique, a "container" has been known. A container is a technique that provides a virtual Operating System (OS) space on an OS. Also, multiple containers can be activated on one VM.

When a container is executed on a VM, an address of a packet transmitted from the transmission source container is translated by IP (Internet Protocol) routing in the VM, and is transmitted from the virtual port of the VM to the virtual switch. The virtual switch forwards the packet to the VM that executes the transmission source container on the basis of the header of the packet. A VM executing the destination container translates the address of the received packet by IP routing, and transmits the packet subjected to the translation to the destination container,

[Patent Document 1] Japanese Laid-open Patent Publication No. 2017-22767

[Patent Document 2] Japanese National Publication of International Patent Application No. 2018-528725

The above port mirroring function of the VM does not consider port mirroring in a unit of a container in environment in which a container is deployed on the VM. For this reason, for example, it is sometimes difficult to appropriately perform mirroring in which information such as a packet transmitted and received by a container is duplicated and forward the duplicated information to the container that carries out monitoring.

SUMMARY

According to an aspect of the embodiment, an information processing system including one or more information processing apparatuses, each of the information processing apparatuses including: a memory that stores association information including a first address of a first container assigned in advance and a second address of a second container assigned in advance in association with each other, the first container and the second container being included in a plurality of containers executed by a plurality of virtual machines; and a processor coupled to the memory, the processor being configured to execute a procedure including: detecting first information being transmitted from one of the plurality of containers, the first information including at least one address; setting, when the address included in the first information matches one of the first address and the second address, one of the first container and the second container including the address matching the address included in the first information and a port of a virtual machine specified by the first information among the plurality of virtual machines in association with each other in the association information; duplicating second information passing through a first port associated with the first container by referring to the association information; and first forwarding the duplicated second information destined for a second port associated with the second container.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 10 is a diagram illustrating an example of a VM mirroring management table;

FIG. 11 is a diagram illustrating an example of an initial state of a container mirroring management table;

FIG. 13 is a diagram illustrating an example of a container mirroring management table;

DESCRIPTION OF EMBODIMENT(S)

Figure 1:
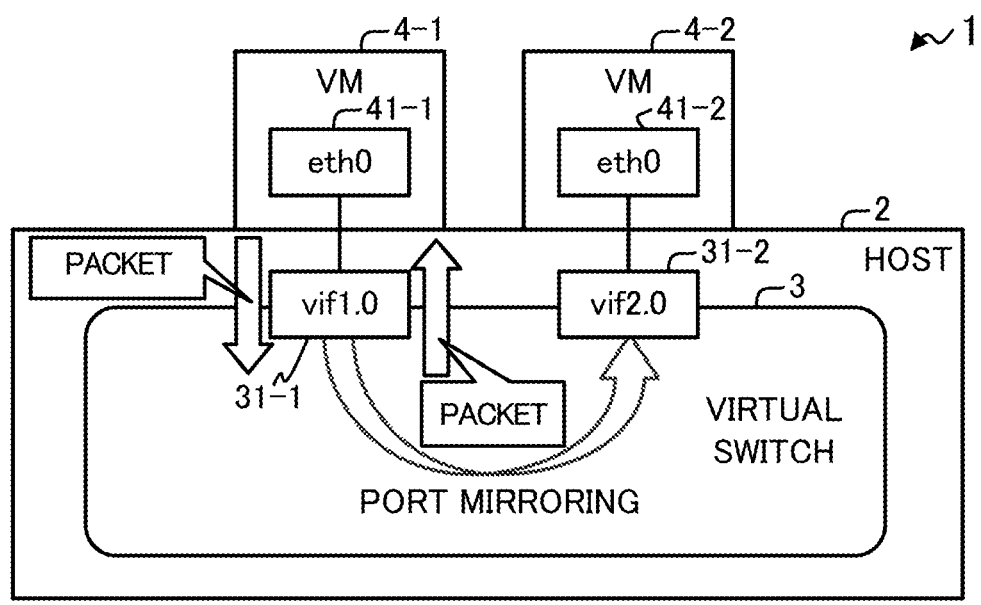
FIG. 1 is a block diagram illustrating an example of port mirroring.

Hereinafter, an embodiment of the present invention will now be described with reference to the accompanying drawings. However, the embodiment described below is merely illustrative and is not intended to exclude the application of various modifications and techniques not explicitly described below. For example, the present embodiment can be variously modified and implemented without departing from the scope thereof.

In the drawings to be used in the following description, the same reference numbers denote the same or similar parts, unless otherwise specified.

[1: Embodiment

FIG. 1 is a block diagram illustrating an example of port mirroring. As illustrated in FIG. 1, in an information processing system 1, virtual switches 3 and VMs 4-1 and 4-2 are executed on a host 2. Hereinafter, when the VMs 4-1 and 4-2 are not distinguished from each other, the VMs 4-1 and 4-2 are denoted to be the VMs 4, omitting the hyphen "-" and the subsequent symbols. The same applies to other functional blocks or HW blocks described below, including hyphens "-" in their reference numbers.

The "host" includes an OS (which may be referred to as a "host OS" or a "virtual OS") which is executed using HW resources of one or more information processing apparatuses, and a virtualization management function such as a hypervisor which is executed on the OS. When the host OS is unnecessary for the virtualization management function, the "host" includes a virtualization management function that is executed using a HW resource.

The virtual switch 3 includes virtual ports (represented by "vif1.0" and "vif2.0" in FIG. 1) 31-1 and 31-2 in association with the virtual ports (denoted as "eth0" in FIG. 1) 41-1 and 41-2 of VMs 4-1 and 4-2, respectively. The virtual ports 31 may be referred to as virtual interfaces (IF).

For example, when port mirroring is set in the virtual port 41-1 of the VM 4-1, the virtual port 31-1 generates a mirror packet when the process on an egress packet from the virtual port 41-1 or an ingress packet to the virtual port 41-1 is completed. The generated mirror packet is forwarded to the virtual port 41-2 of the VM 4-2 that carries out monitoring via the virtual switch 3 and the virtual port 31-2.

Figure 2:
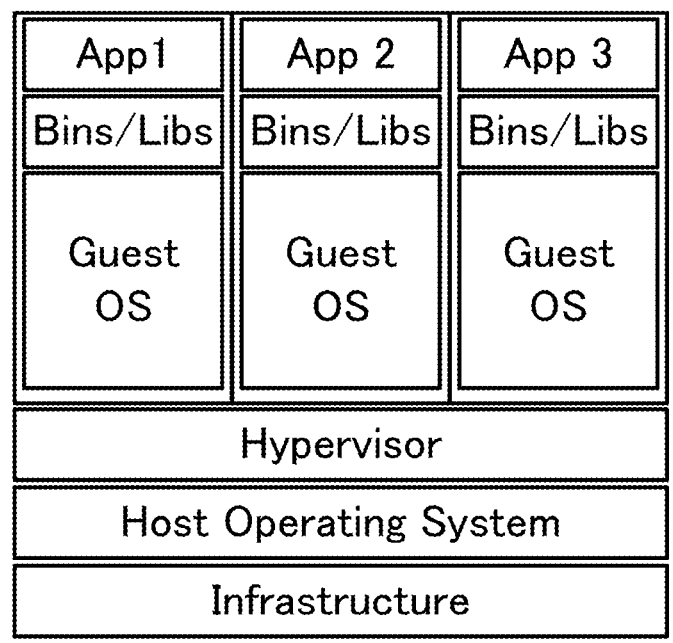
FIG. 2 is a diagram illustrating an example of server-based virtualization.
Figure 3:
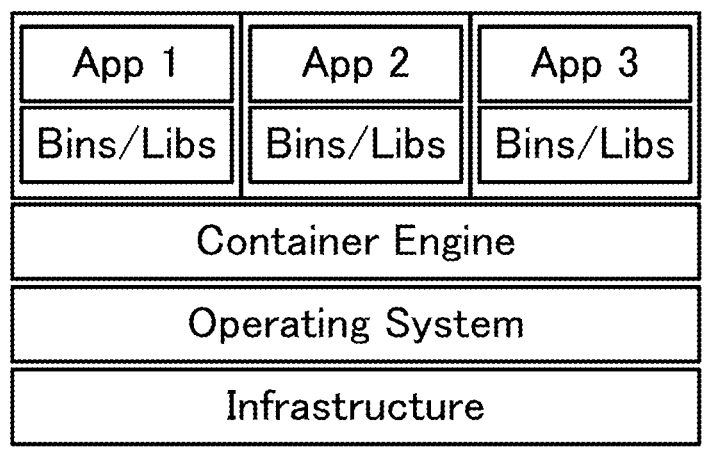
FIG. 3 is a diagram illustrating an example of container-based virtualization.

FIG. 2 is a diagram illustrating an example of server-based virtualization such as VM, and FIG. 3 is a diagram illustrating an example of container-based virtualization.

As illustrated in FIG. 2, in the server-based virtualization, a host OS is executed on the physical infrastructure such as HW resources and NW (Network) resources, and multiple VMs are executed by a hypervisor executed on the host OS. The VM includes a guest OS, binaries and libraries, and applications.

As illustrated in FIG. 3, in container-based virtualization, an OS is executed on a physical infrastructure such as HW resources or NW resources, and multiple containers are executed by a container engine executed on the OS. A container may include binaries and libraries, and applications.

As illustrated in FIG. 3, in the container-based virtualization, a virtual OS space is provided on the OS. Thus, for example, it is also possible to activate multiple containers on the VM (which may be referred to as "guest OS") illustrated in FIG. 2.

Figure 4:
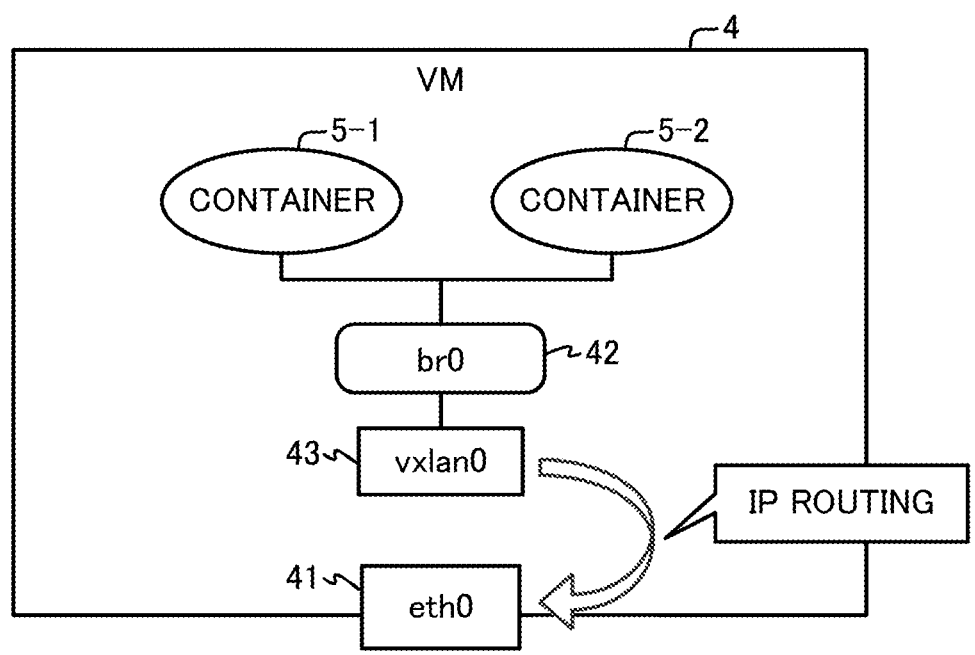
FIG. 4 is a block diagram illustrating an example of a container network.

FIG. 4 is a block diagram illustrating an example of a container network. As illustrated in FIG. 4, it is assumed that multiple containers 5-1 and 5-2 are executed in VM 4. In the container network, an overlay network is constructed by a VXLAN.

As illustrated in FIG. 4, the containers 5-1 and 5-2 are connected to a VXLAN port (represented by "vxlan0" in FIG. 4) 43 via a virtual bridge (represented by "br0" in FIG. 4) 42. Packets are forwarded between the VXLAN port 43 and the virtual port 41 not by bridge connection but by IP-routing.

Here, it is assumed that, the port mirroring of the container 5 is performed by using the port mirroring function of the VM 4 in environment in which the container 5 is disposed on the VM 4.

Figure 5:
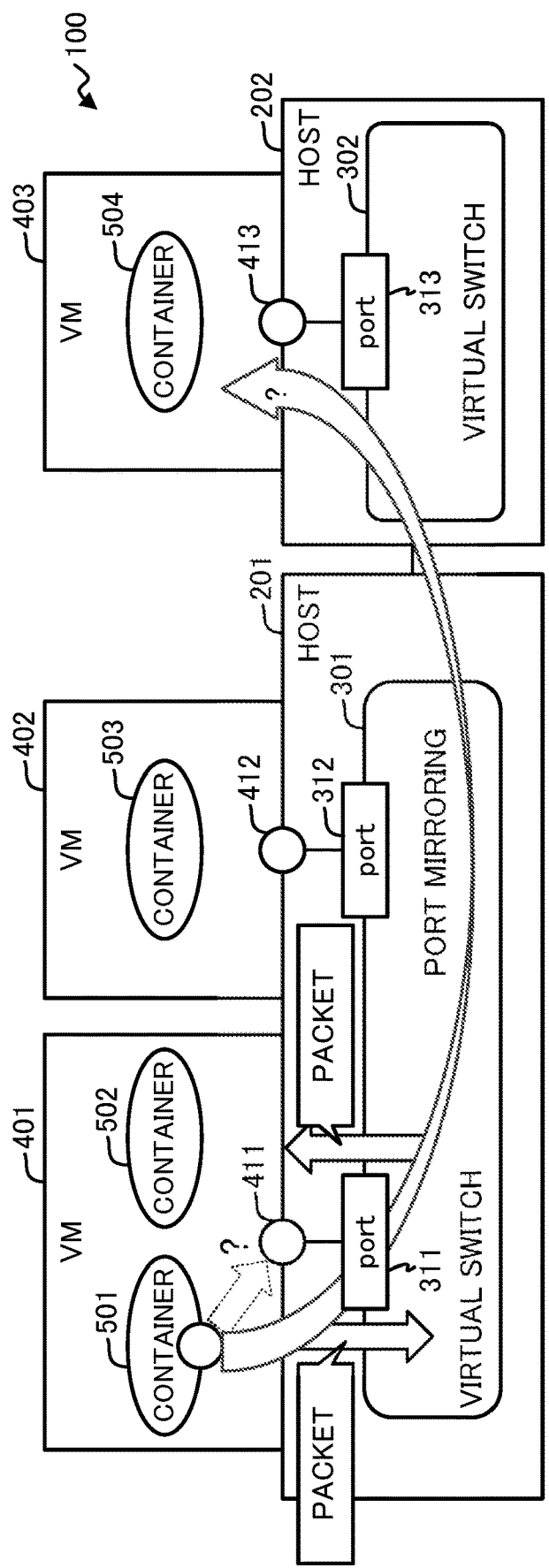
FIG. 5 is a block diagram schematically illustrating operation of an information processing system according to a comparative example.
Figure 6:
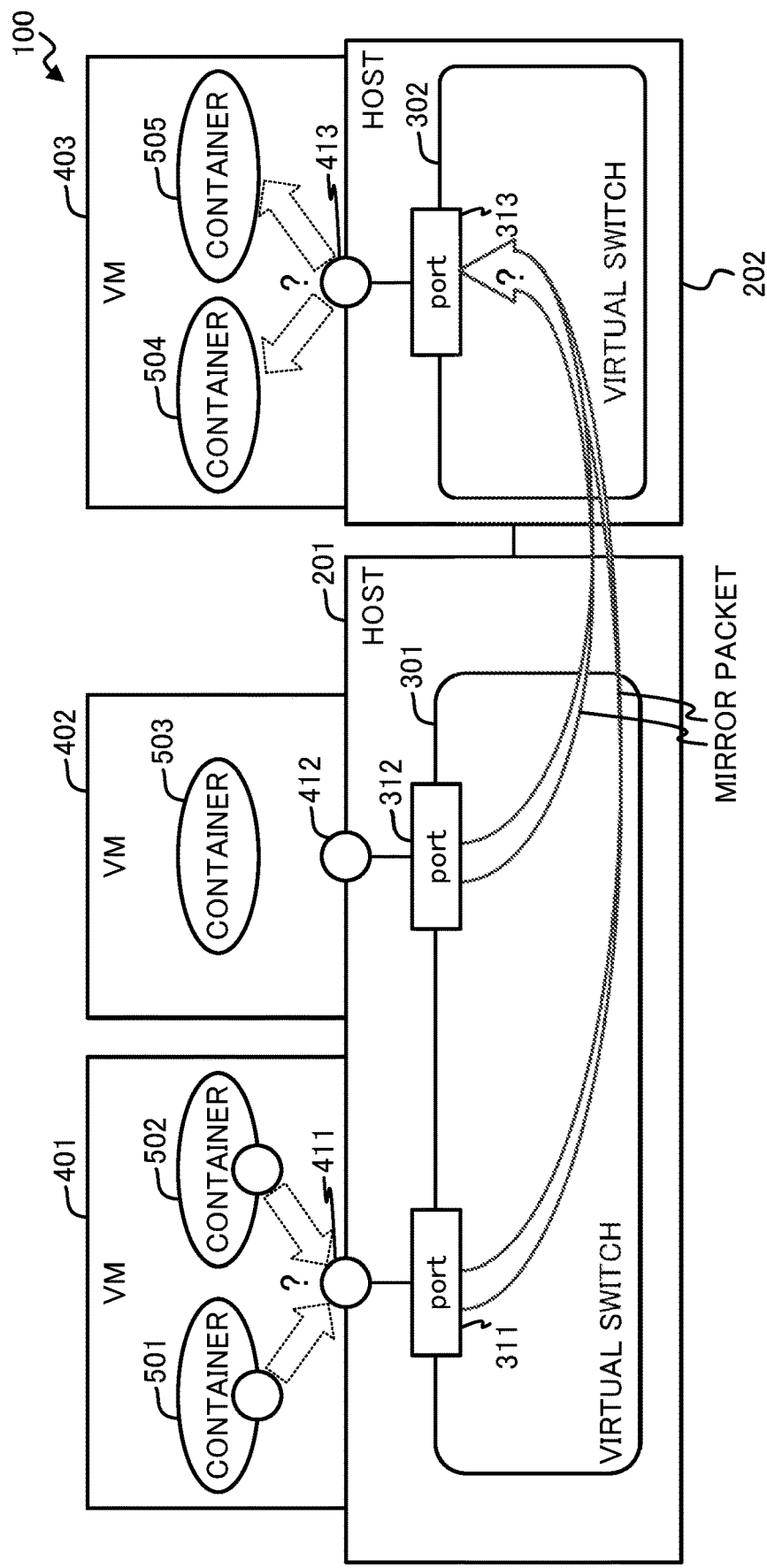
FIG. 6 is a block diagram schematically illustrating operation of an information processing system according to a comparative example.

FIGS. 5 and 6 are block diagrams illustrating the operation of an information processing system 100 according to a comparative example. As illustrated in FIG. 5, it is difficult for the virtual switches 301 and 302 that operates in the hosts 201 and 202, respectively, to recognize VMs 401 to 403 to which the containers 501 to 504 are deployed.

For example, the virtual switches 301 and 302 are unable to specify the VM 401 that executes the container 501 to be monitored and the VM 403 that executes the container 504 that is the destination of a captured packet. Therefore, the virtual switches 301 and 302 are unable to specify the virtual ports 411 and 412 that set the packet capture, which makes it difficult to perform port mirroring from the container 501 to the container 504.

As exemplarily illustrated in FIG. 6, it is also conceivable to set port mirroring for all the VMs 401 to 403 deployed in the hosts 201 and 202. However, likewise the case of FIG. 5, it is unclear which one of the containers 501 to 505 is to be mirrored, and in which one of the VMs 401 to 403, the container 505 for which the mirror packets are destined is activated.

Even if the VM 403 that executes the container 505 is successfully specified, it is unclear, in cases where multiple containers 504 and 505 are activated in VM 403, which of the containers 504 and 505 a mirror packet is to be forwarded to.

Furthermore, in the example of FIG. 6, the mirroring is also performed on the packets of the containers 502 to 504 (e.g., belonging to other users) in addition to a packet of a VM to be monitored. This causes inconvenience in terms of security, and also unnecessary HW resources and NW resources are consumed in an information processing apparatus that executes the hosts 201 and 202.

As a solution to the above, description will now be made in relation to a method of appropriately performing a process of duplicating information transmitted and received by a first container executed on a virtual machine and forwarding the duplicated information to a second container.

[1-1] Example of Configuration of the Embodiment

Example of Hardware Configuration

Figure 7:
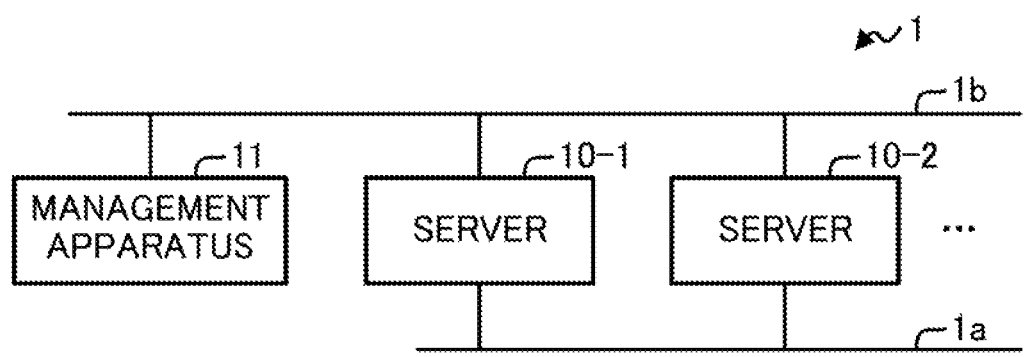
FIG. 7 is a block diagram illustrating an example of the HW configuration of an information processing system according to an example of the embodiment.
Figure 8:
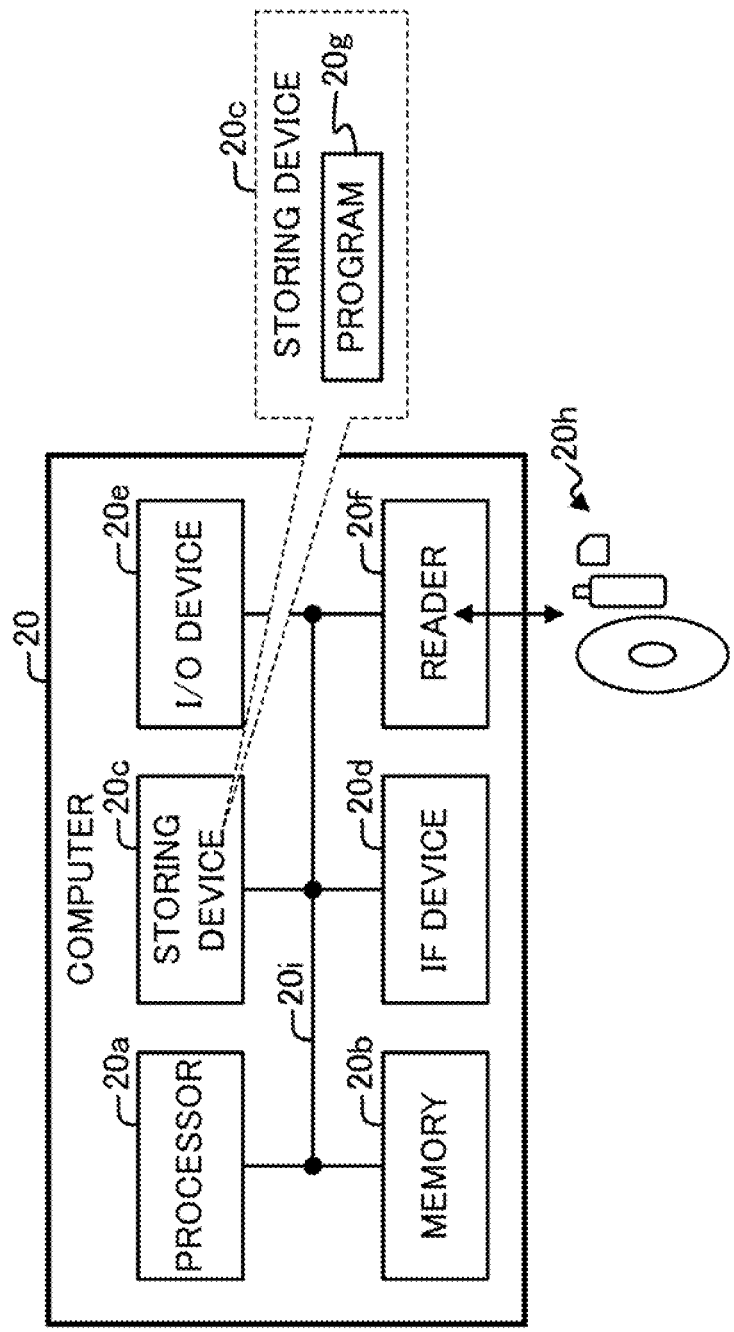
FIG. 8 is a block diagram illustrating an example of the HW configuration of a computer of an example of the embodiment.

FIG. 7 is a block diagram illustrating an example of the HW configuration of the information processing system 1 according to an example of the embodiment, and FIG. 8 is a block diagram illustrating an example of the HW configuration of the computer 20 of an example of the embodiment.

As illustrated in FIG. 7, the information processing system 1 may include multiple servers 10-1 and 10-2 and a management apparatus 11. Although two servers 10 appear in FIG. 7 for the sake of convenience, the information processing system 1 may include three or more servers 10.

The server 10 is an example of an information processing apparatus and provides an HW resource for executing the host 2 illustrated in FIG. 1. The multiple servers 10 may be communicably connected to each other by a virtualization network 1a.

The management apparatus 11 is an example of an information processing apparatus, and manages at least one of the hosts 2, the virtual switch 3, the VMs 4, and the containers 5 illustrated in FIG. 1. In the management apparatus 11, for example, various processes such as setting may be performed by an operator such as an administrator via a non-illustrated terminal or the like. The management apparatus 11 may be one or more of the multiple servers 10.

The management apparatus 11 and the multiple servers 10 may be communicably connected to each other by a management network 1b. The management network 1b may be replaced with a virtualization network 1a.

Each of the virtualization network 1a and the management network 1b may be a network such as a LAN (Local Area Network) compliant with Ethernet (registered trademark).

The servers 10 and the management apparatus 11 may have the same HW configuration. Hereinafter, referring to FIG. 8, an example of the HW configuration of a computer 20 will be described as a representative of the servers 10 and the management apparatus 11. As illustrated in FIG. 8, the computer 20 may include a processor 20a, a memory 20b, a storing device 20c, an IF device 20d, an I/O (Input/Output) device 20e, and a reader 20f.

The processor 20a is communicably connected to the blocks 20b to 20f via a bus 20i, and is an example of an arithmetic processing device for performing various controls and calculations. The processor 20a achieves various functions in the server 10 or the management apparatus 11 by executing a program stored in the memory 20b, the storing device 20c, or the recording medium 20h, or the like.

The processor 20a may be a multiprocessor including multiple processors, may be a multicore processor having multiple processor cores, or may have a configuration having multiple multicore processors.

Examples of the processor 20a include an integrated circuit (IC) such as a Central Processing Unit (CPU), a Micro Processing Unit (MPU), a Graphics Processing Unit (GPU), an Accelerated Processing Unit (APU), a Digital Signal Processor (DSP), an Application Specific IC (ASIC), and a Field-Programmable Gate Array (FPGA).

The memory 20b is a storing apparatus that stores various data and programs. The processor 20a stores and expands data and a program in the memory 20b when executing the program. An examples of the memory 20b is a volatile memory such as a random access memory (RAM).

The storing device 20c is a HW that stores various data, programs, and the like. Examples of the storing device 20c include various devices of a magnetic disk device such as a Hard Disk Drive (HDD), a semiconductor drive device such as an SSD, and a nonvolatile memory. Examples of a non-volatile memory include a Flash memory, Storage Class Memory (SCM), and a Read Only Memory (ROM).

The IF device 20d controls wired or wireless connections and communications of the virtualization network 1a or the management network 1b with other networks.

The I/O device 20e may include at least one of an input device such as a mouse or a keyboard, and an output device such as a monitor display or a printer. For example, in the management apparatus 11, the I/O device 20e may be used for various operations by an administrator or the like.

The reader 20f is a device that reads data and a program recorded in a non-transitory computer readable recording medium 20h. The program 20g may be stored in the recording medium 20h. For example, the processor 20a may expand the program 20g read from the recording medium 20h using the reader 20f into a storing apparatus such as the memory 20b and execute the expanded program.

An example of the recording medium 20h includes a non-transitory recording medium such as a magnetic/optical disk or a flash memory. Examples of the magnetic/optical disk include a flexible disk, a Compact Disc (CD), a Digital Versatile Disc (DVD), a Blu-ray disk, and a Holographic Versatile Disc (HVD). Examples of the flash memory include a USB memory and an SD card.

The above HW configuration of the server 10 and the management apparatus 11 is an example. Accordingly, the number of HW blocks in the server 10 or the management apparatus 11 may be increased or decreased (e.g., addition or omission of arbitrary blocks), divided, integrated in arbitrary combinations, and addition or omission of the bus may be accomplished appropriately.

Example of Functional Configuration

Figure 9:
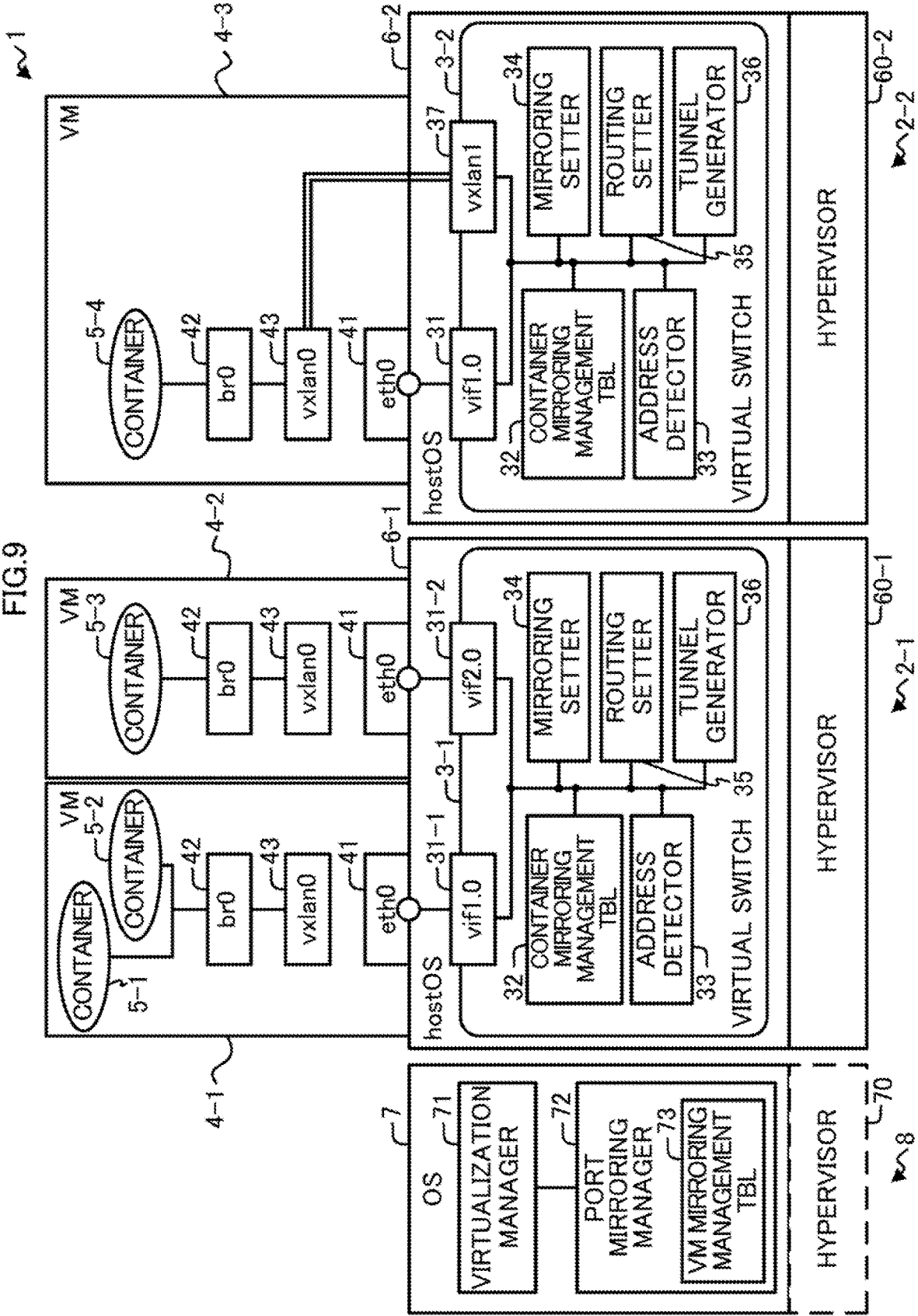
FIG. 9 is a block diagram illustrating an example of a functional configuration of an information processing system of an example of an embodiment.

FIG. 9 is a block diagram illustrating an example of the functional configuration of the information processing system 1 of an example of an embodiment. As illustrated in FIG. 9, the information processing system 1 may include the hosts 2-1 and 2-2 and a management machine 8 as a functional configuration. In the example illustrated in FIG. 9, the information processing system 1 includes two hosts 2-1 and 2-2 as an example for convenience, but alternatively, may include three or more hosts 2.

The hosts 2-1 and 2-2 may be implemented by utilizing the HW configuration provided by the multiple servers 10 (see FIG. 7).

The host 2 may execute a host OS 6 and execute a hypervisor 60 on the host OS 6. The hypervisor 63 is an example of a virtualization management function. When the host OS 6 is not necessary for the hypervisor 60, the host 2 may execute the hypervisor 60. In FIG. 9, it is assumed that the host 2-1 executes the host OS 6-1 and the hypervisor 60-1, and the host 2-2 executes the host OS 6-2 and the hypervisor 60-2.

On the host OS 6 (hypervisor 60), the virtual switch 3 and one or more the VMs 4 may be executed. In the example of FIG. 9, it is assumed that the host OS 6-1 executes the virtual switch 3-1 and the VMs 4-1 and 4-2, and the host OS 6-2 executes the virtual switch 3-2 and the VM 4-3. The details of the virtual switch 3 will be described below.

The VM 4 is an example of a virtual machine that operates using the HW resource of the server 10, and in the embodiment can execute (activate) one or more containers 5. The VM 4 may include a virtual port 41, a virtual bridge 42, and a VXLAN port 43, as illustrated in FIG. 4.

The virtual bridge 42 enables communication between the containers 5 connected to the virtual bridges 42 in a VM 4.

The VXLAN port 43 generates a VXLAN packet (hereinafter, sometimes simply referred to as a "packet") by attaching a VXLAN header to a packet transmitted from a container 5, and forwards the VXLAN packet to the virtual port 41. The VXLAN port 43 removes the VXLAN header from the VXLAN packet received from the virtual port 41 to extract the original packet, and forwards the extracted packet to the virtual bridge 42. The VXLAN header may include a VLAN ID for identifying the virtualization network.

The management machine 8 may be achieved using the HW configuration provided by the management apparatus 11 (see FIG. 7).

The management machine 8 may execute a OS7 (e.g., a virtual OS) and may execute the hypervisor 70 on the OS 7. In the management machine 8, the OS 7 may be an actual OS, and in this case, the hypervisor 70 do not have to be executed.

The OS 7 may include a virtualization manager 71 and a port mirroring manager 72. The virtualization manager 71 manages each VM 4 in the host 2 and the containers 5 in the VM 4.

The port mirroring manager 72 manages port mirroring in the host 2. For example, the port mirroring manager 72 may manage a VM mirroring management table 73 (denoted as "VM mirroring management TBL" in FIG. 9) to be the target of port mirroring, and instruct the host 2 to execute port mirroring in a unit of a VM 4 on the basis of the table 73.

The VM mirroring management table 73 may be set by, for example, an operator or the like. FIG. 10 illustrates an example of the VM mirroring management table 73.

As illustrated in FIG. 10, the VM mirroring management table 73 may exemplarily include "ID", "NAME", "PORT ID", "MIRRORING DIRECTION", and "MONITORED PORT ID".

The "ID" (Identifier) is an example of identification information that identifies an entry for port mirroring. The "NAME" is the name of the virtual port 41 of the target VM 4 of port mirroring and is, for example, set to "VM1_eth0" or the like. The "PORT ID" is an example of identification information of the virtual port 41 of the target VM 4. The "MONITORED PORT ID" is an identification information of the virtual port 41 of the destination VM 4 of a mirror packet by port mirroring.

The "MIRRORING DIRECTION" indicates the forwarding direction of a packet of the target of port mirroring with respect to the target VM 4 and is set to "OUTPUT", "INPUT", or "BIDIRBCTION", for example. The "OUTPUT" indicates that a packet output from the target VM 4 is a target, and the "INPUT" indicates that a packet input into the target VM 4 is a target. The "BIDIRECTION" indicates that a packet input into the target VM 4 and a packet output from the target VM 4 are both targets.

In FIG. 10, the data stored in the VM mirroring management table 73 is represented in a table format for the sake of convenience, but the data is not limited thereto. Alternatively, the VM mirroring management table 73 may store data in various forms such as a Database (DB) format, an extensible Markup Language (XML) format, and an array. The VM mirroring management table 73 may be stored, for example, in a storing region of the memory 20b or the storing device 20c (see FIG. 8) of the management apparatus 11.

The port mirroring manager 72 may receive information of the target container 5 to be subjected to port mirroring in a unit of a container 5, and information of the destination container 5 to be a destination of a mirror packet by port mirroring. The information may be input from, for example, an operator or the like. The port mirroring manager 72 may transmit the received information to a host 2, for example, a virtual switch 3. The information of a target container 5 and a destination container 5 includes, for example, an address of each container 5, for example, an IP address.

[1-2] Example of Configuration of Virtual Switch

The virtual switch 3 controls communication between multiple VMs 4. A virtual switch 3 according to the embodiment performs port mirroring in a unit of a VM 4 or in a unit of a container 5 in response to an instruction from the management machine 8. Hereinafter, a configuration focusing on port mirroring in a unit of a container 5 by the virtual switch 3 will now be described.

As illustrated in FIG. 9, the virtual switch 3 may include one or more virtual ports 31, a container mirroring management table (denoted as "container mirror manager TBL" in FIG. 9) 32, an address detector 33, a mirroring setter 34, a routing setter 35, and a tunnel generator 36. In the example of FIG. 9, the virtual switch 3-1 includes two virtual ports 31-1 and 31-2, and the virtual switch 3-2 includes one virtual port 31.

Here, in one embodiment, the target container 5 is assumed to be the container 5-1 of the VM 4-1 that operates on the virtual switch 3-1, and the destination container 5 is assumed to be the container 5-4 of the VM 4-3 that operates on the virtual switch 3-2. In this instance, the virtual switch 3-2 responsible for the VM 4 that executes the destination container 5-4 may further include a VXLAN port 37 generated by the tunnel generator 36 that is to be described below.

A virtual port 31 is a virtual IF included in the virtual switch 3, and is connected to the virtual port 41 of the VM 4. The virtual port 31 performs a predetermined process on a packet from the virtual port 41 of the associated VM 4, and forwards the packet to the routing setter 35, and performs a predetermined process on a packet from the routing setter 35, and forwards the packet to the virtual port 41 of the associated VM 4. The predetermined processes may include various processes such as updating of a header of a packet.

In addition, the virtual port 31 according to the embodiment may duplicate, as a predetermined process, a packet passing through the virtual port 41 of VM 4 that executes the target container 5 and being destined for an IP address different from, for example, the destination container 5, on the basis of the container mirroring management table 32 that is to be described below. On the basic of the container mirroring management table 32, the virtual port 31 may forward the duplicated packet to the routing setter 35, regarding the virtual port 41 of the VM 4 that executes the destination containers 5 as the destination.

In forwarding the duplicated packet, the virtual port 31 may attach identification information indicating that the packet is a mirror packet to the header of the packet (VXLAN packet). An example of the identification information indicating that the packet is a mirror packet includes a particular VLAN ID assigned in advance.

The container mirroring management table (hereinafter, sometimes referred to as "management table") 32 is an example of association information that associates the address of each container 5 with a port of a VM 4, and is a table that manages port mirroring in a unit of a container 5. The management table 32 may be generated and updated by, for example, the virtual switches 3 with reference to the information of a target container 5 and the information of a destination container 5 received from the management machine 8.

FIG. 11 is a diagram illustrating an example of an initial state of the container mirroring management table 32. As illustrated in FIG. 11, the management table 32 may exemplarily include, for example, "ID", "TARGET ADDRESS", "TARGET PORT ID", "MIRRORING DIRECTION", "DESTINATION ADDRESS", and "DESTINATION PORT ID".

The "ID" is an example of an identification information that identifies an entry for port mirroring in a unit of a container 5. The "TARGET ADDRESS" is an address of a target container 5, and is, for example, an IP address. The "DESTINATION ADDRESS" is an address of a destination container 5, and is, for example, an IP address.

The "MIRRORING DIRECTION" indicates the forwarding direction of a packet of the target of port mirroring with respect to the target container 5 (VM 4) and is set to "OUTPUT", "INPUT", or "BIDIRECTION", for example. The "OUTPUT" indicates that the packet to be output from a target container 5 is a target, and the "INPUT" indicates that the packet to be input into the target container 5 is a target. The "BIDIRECTION" indicates that a packet to be input to a target container 5 and a packet to be output from a target container 5 are both targets.

The "TARGET PORT ID" is an example of identification information of the "port" to which the target container 5 is connected, and the "DESTINATION PORT ID" is an example of identification information of the "port" to which a destination container 5 is connected. Here, the "connection" includes a logical connection. In one embodiment, the "TARGET PORT ID" and the "DESTINATION PORT ID" each indicate the ID of a virtual port 41 in a VM 4, but the present invention is not limited thereto. Alternatively, the "TARGET PORT ID" and "DESTINATION PORT ID" may be each the ID of a virtual port 31 of a virtual switch 3 connected to the virtual port 41.

In the initial state of the management table 32, in oilier words, after the virtual switch 3 sets the management table 32 in obedience to an instruction from management machine 8, the management table 32 is in a state in which "ID", "TARGET ADDRESS", "MIRROR DIRECTION", and "DESTINATION ADDRESS" are set. In other words, when an entry is added to the management table 32, the addresses of a target container 5 and a destination container 5 are assigned, and a packet to be the target of port mirroring is assigned.

On the other hand, the "TARGET PORT ID" and the "DESTINATION PORT ID" are not set (blanks or "NULL") in the initial state of the control table 32. This is because it is difficult to specify the target container 501 and the destination container 504 in case where the containers 501 to 505 are executed on the VMs 401 to 433 like in the comparative examples illustrated in FIGS. 5 and 6.

Figure 12:
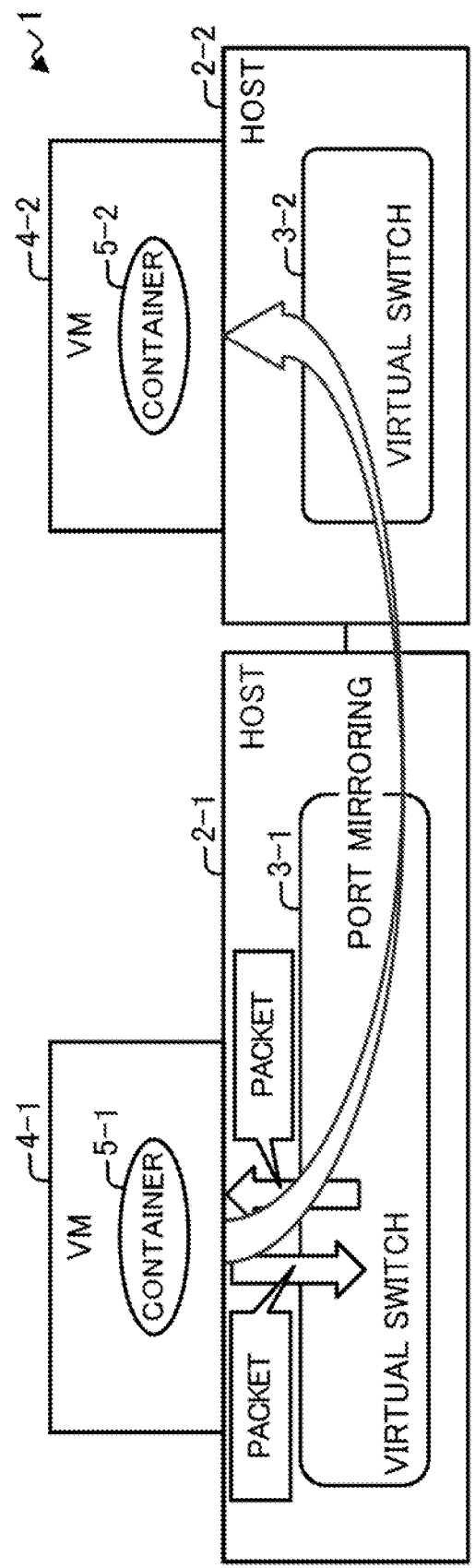
FIG. 12 is a block diagram illustrating an example of port mirroring according to the embodiment.

Therefore, the virtual switch 3 according to the embodiment can execute port mirroring between the containers 5 assigned in the management table 73 by specifying the "TARGET PORT ID" and the "DESTINATION PORT ID" in the method described below, as illustrated in FIG. 12.

In FIG. 11, the data stored in the management table 32 is represented in a table format for the sake of convenience, but the data is not limited thereto. Alternatively, the management table 32 may store data in various forms such as a DB format, an XML format, and an array. The management table 32 may be stored in, for example, a storing region of the memory 20b or the storing device 20c (see FIG. 8) of the server 10. The memory 20b or the storing device 20c of the server 10, which scores the management table 32, are examples of a memory included in the information processing apparatus.

The address detector 33 is an example of a detecting unit, and monitors each of the multiple virtual ports 31 and 41 to detect packets of a particular type egress by the containers 5.

A packet of the particular type may be, for example, a packet including an address (e.g., IP address) of at least one of a transmission source and a destination of the packet, and may be a packet that is likely to be transmitted or received at least once in the operation of each container 5.

Examples of the "packet of the particular type" includes an Address Resolution Protocol (ARP) packet or a Dynamic Host Configuration Protocol (DHCP) response packet that is transmitted or received at a predetermined timing, such as after activating the container 5 or during accessing of the container 5. An ARP packet includes, for example, the IP address of a container 5 serving as the source IP address, and a DHCP response packet includes, for example, the IP address of a container 5 serving as the offer IP address by a DHCP server.

The packets of the particular type are not limited to ARP and DHCP packets, and various types of packets transmitted from the container 5 or received by the container 5 at predetermined timings may be used. The packet of the particular type is an example of the first information or the control information.

The mirroring setter 34 is an example of a setting unit. On the basis of the detected packet detected by the address detector 33, the mirroring setter 34 specifies a target VM 4 that activates the target container 5 and a destination VM 4 that activates the destination container 5.

For example, the mirroring setter 34 determines whether the IP address included in the detected packet matches the IP address of the target container 5 or the IP address of the destination container 5. The IP address included in the detected packet is, for example, the source IP address of an ARP packet or the offer IP address of DHCP response packet.

The IP address of the target container 5 is an example of the address of the first container 5 assigned in advance, and the IP address of the destination container 5 is an example of the address of the second container 5 assigned in advance.

As a result of the above determination, if the IP address of the detected packet matches the IP address of the target container 5 in the management table 32, for example, it is understood that the target container 5 is connected to the virtual port 41 that has detected the detected packet (through which the detected packet passes). Therefore, the mirroring setter 34 sets port mirroring in the virtual port 41, which is an example of the first port.

If the IP address of the detected packet matches the IP address of the destination container 5 in the management table 32, for example, it is understood that the destination container 5 is connected to the virtual port 41 that has detected the detected packet (through which the detected packet passes). Therefore, the mirroring setter 34 determines the virtual port 41, which is an example of a second port to be the destination port of the port mirroring.

For example, the mirroring setter 34 sets, in the management table 32, the target container 5 or the destination container 5 whose IP address matches the IP address of the detected packet and the port ID of the virtual port 41 of a VM 4 (or the virtual port 315 specified on the basis of the transmitted packets in association with each other. Thereby, in the management table 32, the "TARGET PORT ID" and the "DESTINATION PORT ID" which have not been set are set as illustrated in FIG. 13.

As described above, according to the mirroring setter 34, the port mirroring for selectively mirroring a packet that matches the IP addresses of a target container 5 can be set to the virtual port 41 (for example, points indicated by circles in FIG. 9) with reference to the setting of the control table 32.

The mirroring setter 34 may perform the above-described determination and updating of the management table 32 each time the address detector 33 detects a packet of the particular type until a "TARGET PORT ID" and a "DESTINATION PORT ID" that have not been set yet are not present in the management table 32, for example.

As described above, according to the address detector 33 and the mirroring setter 34, by monitoring a packet of the particular type in the virtual switch 3, the information of the management table 32 can be supplemented for each of the hosts 2, for example. Therefore, this can eliminate the requirement to share the management table 32 between the hosts 2, which makes it possible to efficiently use the KW resources and the NW resources. In other words, the processing load of the servers 10 and the communication load of the virtualization network 1a can be reduced.

Further, for example, at a predetermined timing such as a timing at which the target container 5 and the destination container 5 are activated, an operation may be performed so as to transmit and receive a packet of the particular type between the target container 5 and the destination container 5. The operation may be controlled by, for example, the management machine 8, the virtual switch 3, or the hypervisor 60. This makes it possible to easily and reliably supplement the information in the management table 32 for each host 2.

The routing setter 35 controls communication between the virtual ports 31. For example, the routing setter 35 forwards the packet forwarded from the virtual port 31 to the virtual port 41 of the VM 4 specified by the header of the same packet.

As described above, the virtual port 31 and the routing setter 35 collectively serve as an example of the duplicate forwarding unit that performs the following process in port mirroring in a unit of a container 5. For example, the virtual port 31 and the routing setter 35 duplicate a packet which is an example of the second information and which passes through the virtual port 41 associated with the target container 5 with reference to the management table 32. Further, for example, the virtual port 31 and the routing setter 35 forward the duplicated packet to be destined for the virtual port 41 associated with the destination container 5.

Here, the destination address of a mirror packet is different from the IP address of the destination container 5 as described above. Therefore, it is difficult for the virtual port 31 connected to the virtual port 41 associated with the destination container 5 to forward the received mirror packet to the destination container 5 in the normal routing.

Therefore, the virtual switch 3 (in the embodiment of FIG. 9, the virtual switch 3-2) responsible for the VM 4-3 that executes the destination container 5-4 converts the mirror packet among the received packets into the VXLAN of the destination container 5, and then forwards the converted mirror packet to the destination container 5.

Figure 14:
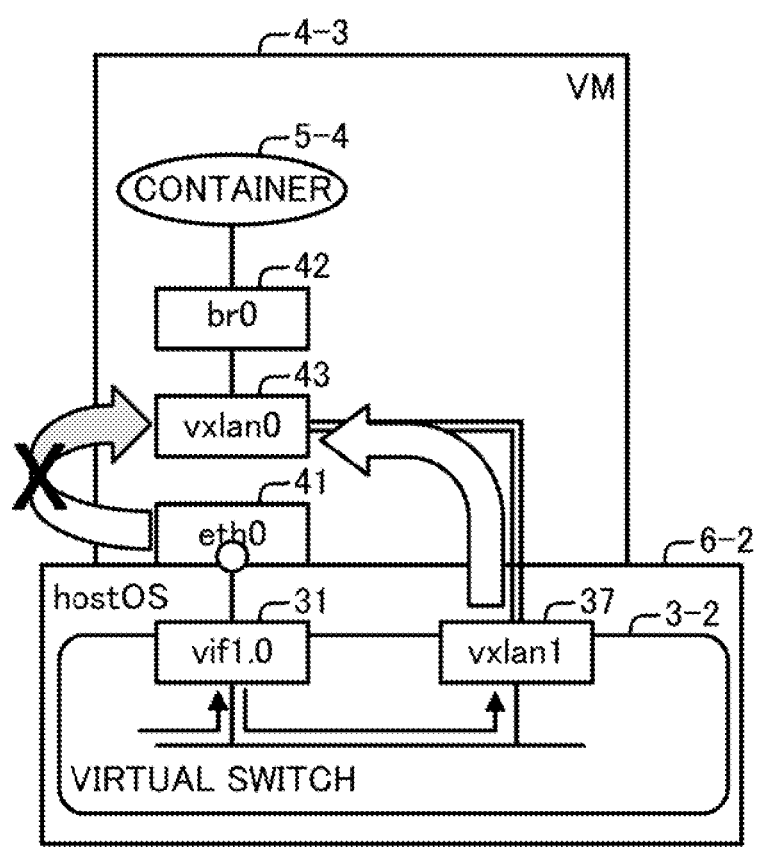
FIG. 14 is a block diagram illustrating an example of a forwarding route of a mirror packet to a destination container.

FIG. 14 is a block diagram illustrating an example of a forwarding route of a mirror packet to the destination container 5. In FIG. 14, some of the configurations illustrated in FIG. 9 are omitted.

The virtual port 31-1 illustrated in FIG. 9 detects, based on the management table 32, a packet including the IP address of the target container 5-1 as the transmission source or the destination and being forwarded in the sane direction as the mirroring direction in the management table 32 among the packets passing through the virtual port 41 of the target port ID. Then, the virtual port 31-1 duplicates the detected packet and forwards the duplicated packet to the virtual port 41 of the destination port ID via the routing setter 35.

The mirror packet forwarded by the routing setter 35 are received from the virtual switch 3-1 by the virtual port 31 associated with the destination port ID included in the virtual switch 3-2 through the communication route (e.g., virtualization network 1a) between the hosts 2.

Upon receiving the packet, the virtual port 31 determines whether or not the packet is a mirror packet. For example, the virtual port 31 may refer to a VLAN ID included in the header of the packet to determine whether the VLAN ID is one indicating a mirror packet. If the virtual port 31 determines that the VLAN ID indicates a mirror packet, the virtual port 31 forwards the packet to the VXLAN port 37 instead of forwarding the packet to the virtual port 41.

At this time, the virtual port 31 may remove the first header information being attached to the mirror packet and being exemplified by the VXLAN header, and may forward the mirror packet subjected to the removal of the VXLAN header to the VXLAN port 37. In this manner, the virtual port 31 is an example of a forwarding unit that forwards a mirror packet forwarded to be destined for the second port to the VXLAN port 37.

The VXLAN port (denoted as "vxlan1" in FIGS. 9 and 14) 37 is a port generated by the tunnel generator 36, and is an example of a tunnel port that forms a tunnel rout between the VXLAN port 37 itself and the VXLAN port 43 of the VM 4.

The tunnel generator 36 is an example of a generating unit, and when the "DESTINATION PORT ID" is set in the management table 32 by the mirroring setter 34, for example, may generate the VXLAN port 37 corresponding to (e.g., communicable with) the VXLAN port 43 included in the VM 4 of the destination port ID. As described above, the tunnel generator 36 generates the VXLAN port 37 to establish a VXLAN tunnel, which is an example of a tunnel route, between the VM 4 and the virtual switch 3.

The VXLAN port 37 encapsulates the mirror packet forwarded from the virtual port 31 by attaching a VXLAN header, which is an example of the second header information destined for a VM 4 that executes the destination container 5-4, to the mirror packet. The VXLAN header may include identification information, such as a VLAN ID, for identifying the tunnel route.

Figure 15:
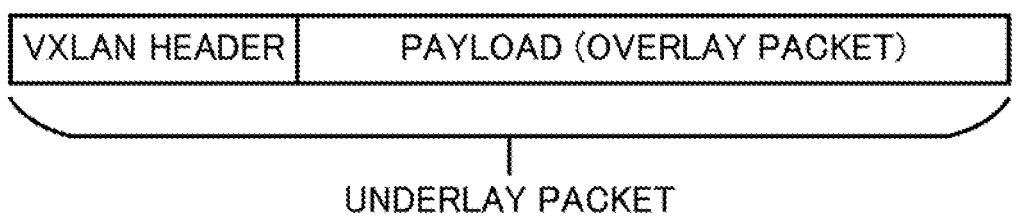
FIG. 15 is a diagram illustrating an example of a mirror packet encapsulated by a Virtual extensible Local Area Network (VXLAN) port.

FIG. 15 illustrates an example of a mirror packet encapsulated by the VXLAN ports 37. As illustrated in FIG. 15, VXLAN port 37 encapsulates the mirror packet by using the mirror packet (which may be referred to as an "overlay packet") from which the VXLAN header has been removed in the virtual port 31 as a payload and attaching a VXLAN header to the payload. Such an encapsulated mirror packet may be referred to as an "underlay packet".

The VXLAN port 37 transmits the encapsulated mirror packet to VXLAN port 43 of the VM 4 via the tunnel route.

In the VM 4, the VXLAN header of the mirror packet is removed by the VXLAN ports 43, and the mirror packet from which the VXLAN header is removed is forwarded to the destination container 5 via the virtual bridge 42.

As described above, according to the embodiment, even when port mirroring of a container 5 is performed using the port mirroring function of a VM 4 in environment where the container 5 is disposed on the VM 4, mirror packets can be correctly delivered to the destination container 5.

[1-3] Example of Operation

Next, examples of operations of the information processing system 1 according to the embodiment configured as described above will be described with reference to FIGS. 16 to 21.

[1-3-1] Detecting Process

First, an example of operation in a detecting process will be described with reference to FIGS. 16 and 21. The detecting process may be executed mainly by the address detector 33 and the mirroring setter 34 of the virtual switch 3 on the basis of, for example, an instruction from the management machine 8.

Figure 16:
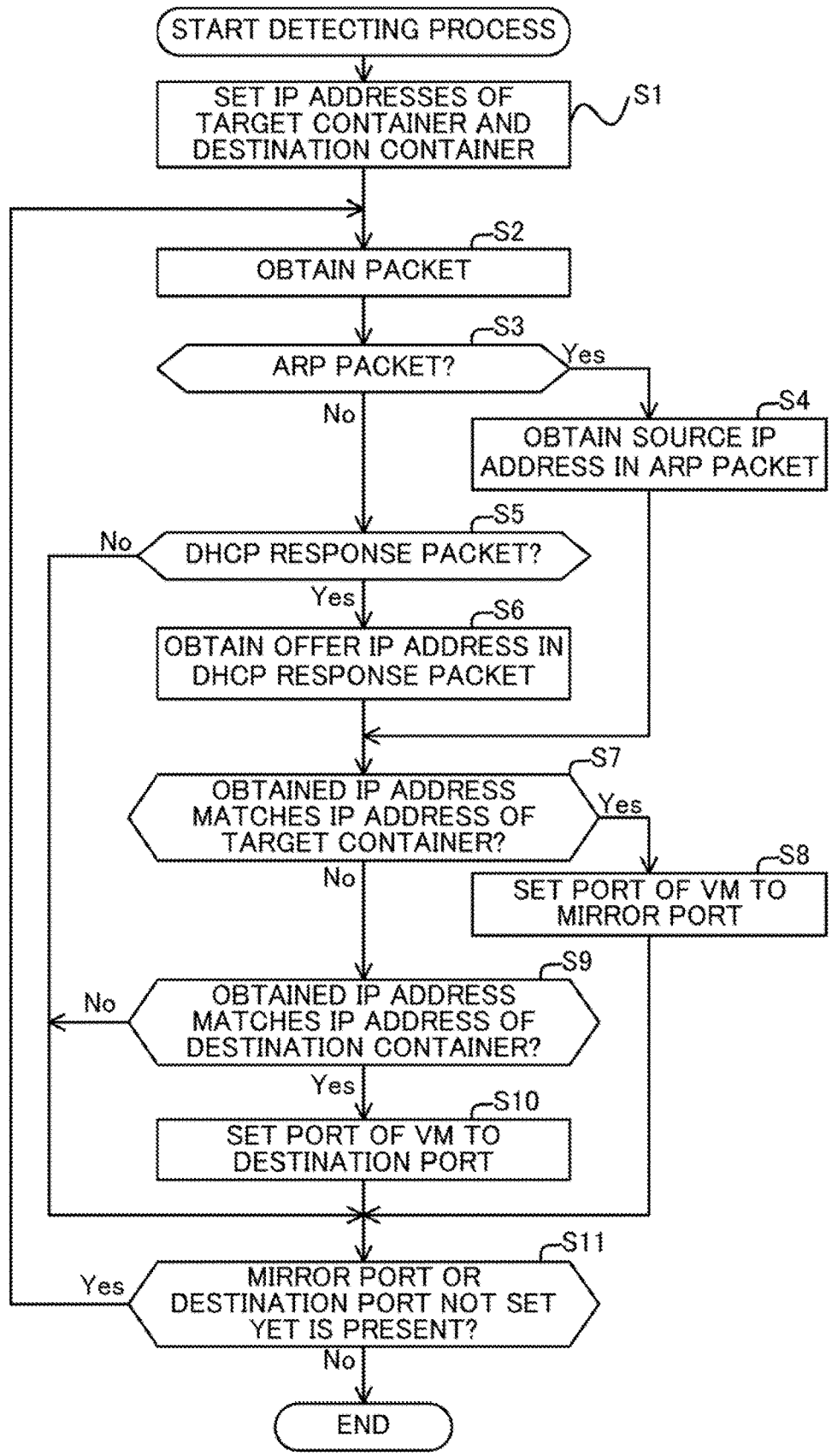
FIG. 16 is a flowchart illustrating an example of operation in a detecting process according to the embodiment.
Figure 21:
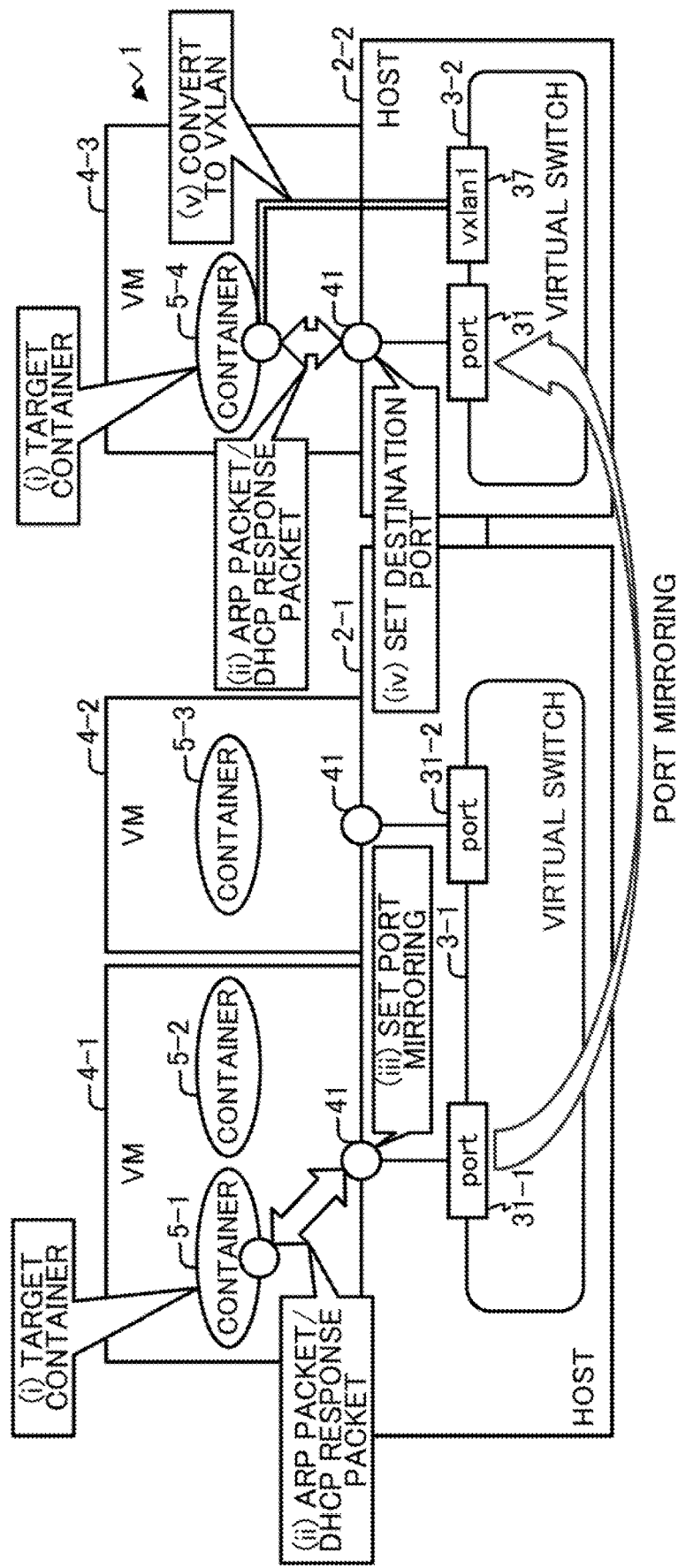
FIG. 21 is a block diagram illustrating an example of an operation of an information processing system according to the embodiment.

As illustrated in FIG. 16, the virtual switch 3 sets the IP addresses of the target container 5 and the destination container 5 (see (i) of FIG. 21) assigned by an execution instruction into the management table 32 in accordance with the execution instruction of container mirroring from the management machine 8 (step S1).

When the management table 32 has an entry in which a "TARGET PORT ID" or a "DESTINATION PORT ID" has not been set yet, the address detector 33 monitors each virtual port 41 (for example, each virtual port 31) and obtains a packet passing through the virtual port 41 (Step S2).

Upon obtaining the packet, the address detector 33 determines whether or not the obtained packet is a packet of the particular type (see (ii) of FIG. 21). For example, the address detector 33 determines whether the obtained packet is an ARP packet (Step S3).

If determining the obtained packet to be an ARP packet (Yes in Step S3), the address detector 33 obtains the source IP address in the ARP packet (Step S4), and the process proceeds to Step S7.

If determining the obtained packet not to be an ARP packet (No in Step S3), the address detector 33 determines whether or not the obtained packet is a DHCP response packet (Step S5). If the obtained packet is determined not to be a DHCP response packet (No in Step S5), the process proceeds to Step S11.

If the obtained packet is determined to be a DHCP response packet (Yes in Step S5), the address detector 33 obtains the offer IP address in the DHCP response packet (Step S6), and the process proceeds to Step S7.

In Step S7, the mirroring setter 34 determines whether or not the IP address obtained by the address detector 33 matches the IP address of the target container 5 set in the management table 32. If determining that the IP addresses to match each other (Yes in Step S7), the mirroring setter 34 sets the virtual port 41 of the VM 4 specified on the basis of the obtained packet to the mirror port (Step S8; see (iii) in FIG. 21), and the process proceeds to Step S11. For example, the mirroring setter 34 may set the ID of the virtual port 41 in the "TARGET PORT ID" in the control table 32.

In determining the IP address of the obtained packet not to match the IP address of the target container 5 (No in Step S7), the mirroring setter 34 determines whether the obtained IP address matches the IP address of the destination container 5 set in the management table 32 (Step S9). If the IP addresses are determined not to match each other (No in Step S9), the process proceeds to Step S11.

If determining that the obtained IP address matches the IP address of the destination container 5 (Yes in Step S9), the mirroring setter 34 sets the virtual port 41 of VM 4 specified on the basis of the obtained packet to the destination port (Step S10; see (iv) in FIG. 21). Then, the process proceeds to Step S11. The destination port may be set, for example, by setting the ID of the virtual port 41 in the "DESTINATION PORT ID" in the management table 32.

In Steps S7 and S9, the VM 4 to be specified on the basis of the obtained packet is, for example, a transmission source VM 4 when the obtained packet is an ARP packet, and a destination VM 4 when the obtained packet is a DHCP response packet.

In addition, the target container 5 and the destination container 5 to be determined in Steps S7 and S9 may be limited to the containers 5 set in an entry for which the port IDs are not set yet in the management table 32.

In Step S11, the mirroring setter 34 determines whether a mirror port or a destination port that has not been set yet is present in the control table 32. If a mirror port or a destination port that has not been set yet is determined to be present (Yes in Step S11), the process proceeds to Step S2 at which the address detector 33 monitors packets. On the other hand, if a mirror port or a destination port that has not been set yet is determined not to be present, in other words, if the setting of all mirror ports and destination ports in the management table 32 has been completed, the process ends.

In consideration of a case where the port ID is difficult to specify, such as a case where the target container 5 or the destination container 5 is under control of the virtual switch 3 executed by another host 2, the number of times or the time period allowed for the transition to the Yes route in Step S11 may be limited. For example, when an entry whose port ID has not been set is present in the management table 32 even after the number of times of the execution reaches a predetermined number or a predetermined time period has elapsed, the virtual switch 3 may obtain a port ID that has not been set yet by synchronizing the management table 32 with another virtual switch 3.

[1-3-2] Tunnel Generating Process

Next, an example of operation in a tunnel generating process will be described by referring to FIG. 17. The tunnel generating process may be executed, for example, mainly by the tunnel generator 36 for each of the entries in the managing table 32 after the completion of the setting in the detecting process.

Figure 17:
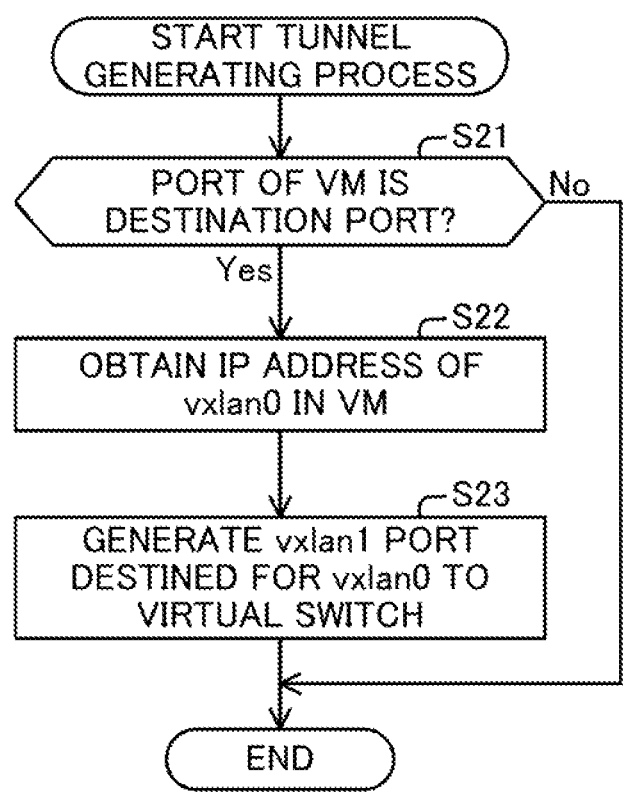
FIG. 17 is a flowchart illustrating an example of operation in a tunnel generating process according to the embodiment.

As illustrated in FIG. 17, the tunnel generator 36 determines whether the virtual port 41 of each VM 4 executed by the local host 2 is a destination port (Step S21). For example, the tunnel generator 36 may obtain, from the management table 32, the destination port ID of an entry for which the detecting process has been completed, compare the obtained destination port ID with the port ID of the virtual port 41 of each VM 4 executed by the local host 2, and determine whether or not the port IDs match each other.

If the virtual port 41 of the VM 4 is determined not to be the destination port (No in Step S21), the process ends.

If the virtual port 41 of the VM 4 is determined to be the destination port (Yes in Step S21), the tunnel generator 36 obtains the IP address of the VXLAN port (denoted as "vxlan0" in FIG. 14 and the like) 43 in the VM 4 (Step S22). Alternatively, the tunnel generator 36 may ask the virtualization manager 71 of the management machine 8 for the IP address of the VXLAN port 43 and obtain the IP address from virtualization manager 71.

The tunnel generator 36 generates a VXLAN port (denoted as "vxlan1" in FIG. 14 and the like) 43 destined for the VXLAN port 37 in the virtual switch 3 (Step S23), and the process ends.

[1-3-3] Mirroring Process

Next, an example of operation in a mirroring process will now be described with reference to FIG. 18. The mirroring process may be executed, for example, mainly by the virtual port 31 and the routing setter 35 each time a packet arrives.

Figure 18:
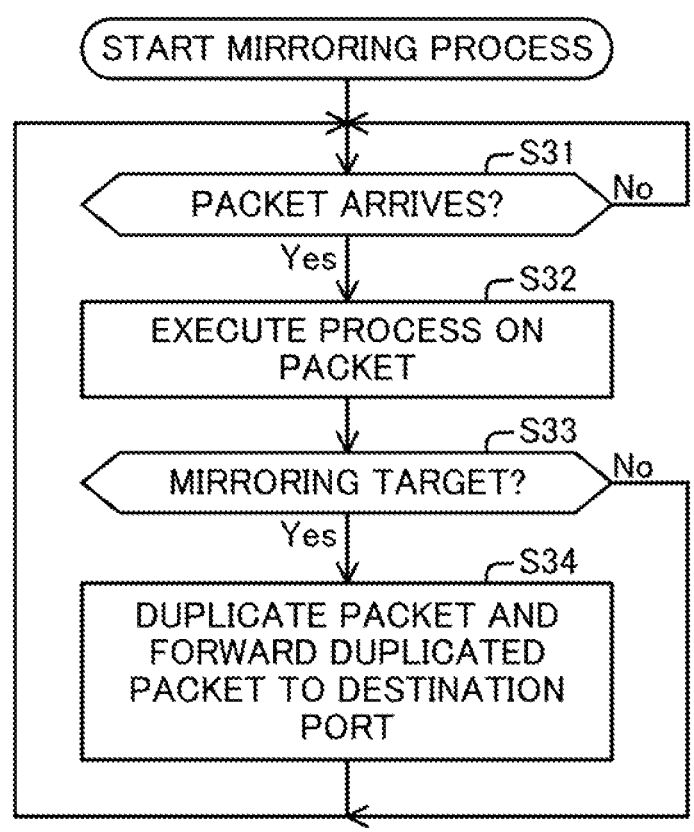
FIG. 18 is a flowchart illustrating an example of operation in a mirroring process according to the embodiment.

As illustrated in FIG. 18, the virtual port 31 waits for the arrival (reception) of a packet (Step S31 and No in Step S31). Here, packets arrive at the virtual port 31 from both an input direction from the routing setter 35 to the virtual port 41 associated with the virtual port 31 and an output direction from the virtual port 41 associated with the virtual port 31 to the routing setter 35.

When a packet arrives (Yes in Step S31), the virtual port 31 carries out a process, such as forwarding the packet to a destination, on the packet (Step S32).

The virtual port 31 determines whether the virtual port 41 associated with the virtual port 31 in question and the packet are the targets of mirroring (Step S33). For example, the virtual port 31 may determine whether or not the virtual port 41 matches the "TARGET PORT ID", whether or not the transmission source or the destination of the packet matches the "TARGET ADDRESS", and whether or not the forwarding direction of the received packet matches the mirroring direction with reference to the management table 32.

If the virtual port 41 and the packet are determined not to be mirroring targets, (for example, at least one of the results of the above determination is negative) (No in Step S33), the process proceeds to Step S31.

If the virtual port 41 and the packet are determined to be mirroring targets, (Yes in Step S33), the virtual port 31 duplicates the packet, and forwards the duplicated packet to be destined for the virtual port 41 assigned to be the "DESTINATION PORT ID" in the entry of the management table 32 (Step S34). Then, the process proceeds to Step S31.

[1-3-4] Packet Forwarding Process

Next, an example of operation in a packet forwarding process will now be described with reference to FIG. 19. The packet forwarding process may be executed, for example, mainly by the virtual port 31 associated with the virtual port 41 of the VM 4 that executes the destination containers 5 each time a packet arrives.

Figure 19:
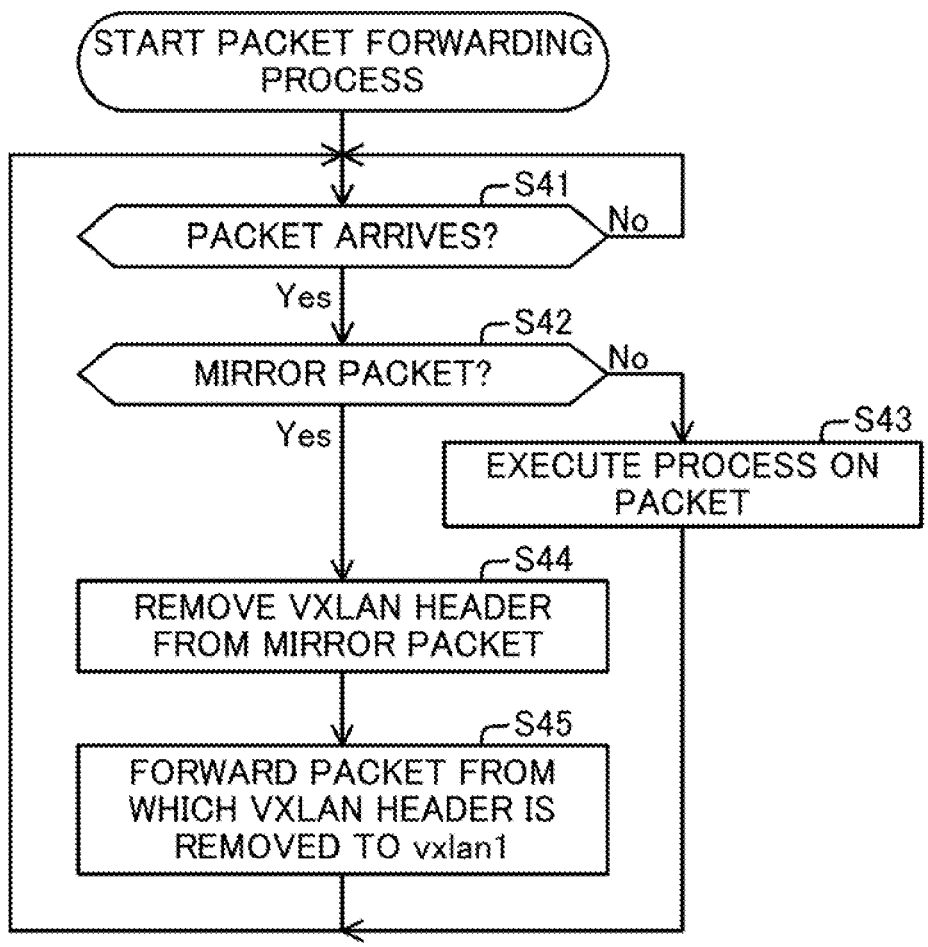
FIG. 19 is a flowchart illustrating an example of operation in a packet forwarding process according to the embodiment.

As illustrated in FIG. 19, the virtual port 31 waits for the arrival (reception) of a packet from the routing setter 35 (Step S41 and No in Step S41).

When the packet arrives (Yes in Step S41), the virtual port 31 determines whether or not the received packet is a mirror packet (Step S42). For example, the virtual port 31 may determine whether the VLAN ID of the packet is a VLAN ID predetermined for a mirror packet. Alternatively, if the destination of the received packet is different from the IP address of the destination container 5, the virtual port 31 may determine the packet to be a mirror packet.

If determining the received packet not to be a mirror packet (No in Step S42), the virtual port 31 carries out a process on the packet (Step S43), and the packet forwarding process proceeds to Step S41.

If determining the received packet to be a mirror packet (Yes in Step S42), the virtual port 31 removes the VXLAN header from the mirror packet (Step S44). Then the virtual port 31 forwards the packet from which the VXLAN header has been removed to the VXLAN port 37 generated by the tunnel generator 36 (Step S45), and the process proceeds to Step S41.

[1-3-5] Encapsulating Process

Next, an example of operation in an encapsulating process will now be described with reference to FIGS. 20 and 21. The encapsulating process may be performed, for example, mainly by the VXLAN port 37 (denoted as "vxlan1" in FIG. 21) each time a mirror packet arrives from the virtual port 31.

Figure 20:
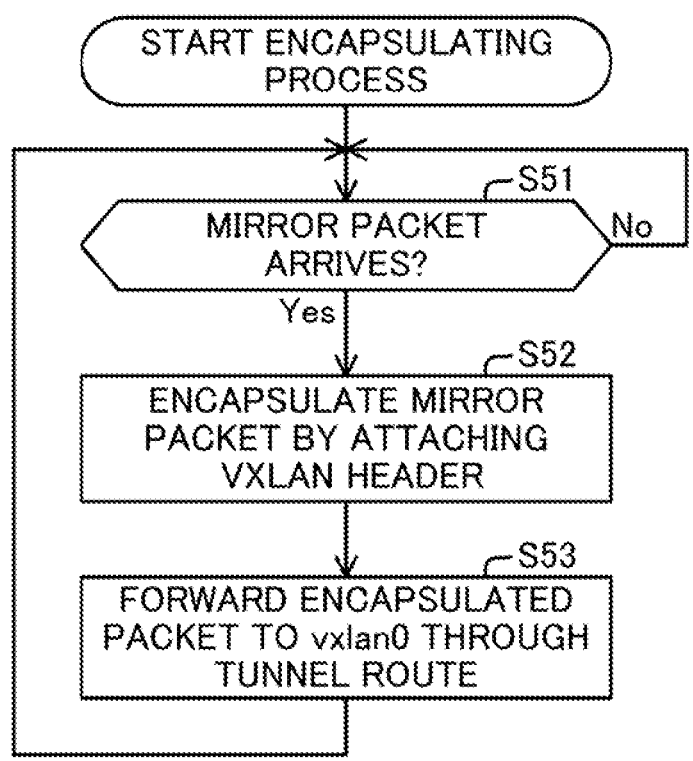
FIG. 20 is a flowchart illustrating an example of operation in an encapsulating process according to the embodiment.

As illustrated in FIG. 20, VXLAN port 37 waits for the arrival (reception) of a packet from the virtual port 31 (Step S51 and No in Step S51).

When the mirror packet arrives (Yes in Step S51), the VXLAN port 37 attaches a VXLAN header to the mirror packet to encapsulate the mirror packet, that is, converts the mirror packet into a VXLAN (Step S52; see (v) of FIG. 21).

Then, the VXLAN port 37 forwards the encapsulated packet to the VXLAN port (denoted as "vxlan0" in FIG. 21) 43 of the VM 4 via the tunnel route (Step S53), and the process proceeds to Step S51.

(2) Miscellaneous

The technique according to the embodiment described above can be changed or modified as follows.

For example, the functional blocks included in information processing system 1 illustrated in FIG. 9 may be merged in any combinations, or may be each divided into two or more functional blocks. The functional blocks included in the hosts 2 or the management machine 8 illustrated in FIG. 9 may be merged in any combinations, or may be each divided into the two or more functional blocks. Furthermore, the functional blocks included in the virtual switch 3 illustrated in FIG. 9 may be merged in any combination, or may be each divided into two or more functional blocks.

In one embodiment, the host 2-1 that executes the target container 5 and the host 2-2 that executes the destination container 5 are assigned to be different hosts 2, but the present invention is not limited thereto. The target container 5 and the destination container 5 may be executed by different VMs 4 operating on the same host 2 and the same virtual switch 3, or may be executed by the same VM 4.

In one aspect, the process of duplicating information transmitted and received by a first container executed on a virtual machine and forwarding the duplicated information to a second container can be suitably performed.

All examples and conditional language recited herein are intended for the pedagogical purposes of aiding the reader in understanding the invention and the concepts contributed by the inventor to further the art, and are not to be construed limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. An information processing system comprising one or more information processing apparatuses,
each of the information processing apparatuses comprising:
a memory that stores association information including a first address of a first container assigned in advance and a second address of a second container assigned in advance in association with each other, the first container and the second container being included in a plurality of containers executed by a plurality of virtual machines; and
a processor coupled to the memory, the processor being configured to execute a procedure comprising:
detecting first information being transmitted from one of the plurality of containers, the first information including at least one address related to specifying of at least one of the plurality of containers executed by at least one of the plurality of virtual machines;
setting, when the address included in the first information matches one of the first address and the second address, one of the first container and the second container including the address matching the address included in the first information and a port of a virtual machine specified by the first information among the plurality of virtual machines in association with each other in the association information;
duplicating second information passing through a first port associated with the first container by referring to the association information; and
first forwarding the duplicated second information destined for a second port associated with the second container.

2. The information processing system according to claim 1, wherein the duplicating duplicates the second information passing through the first port and transmitted or received between the address included in the first information and an address different from the second address.

3. The information processing system according to claim 1, wherein the procedure is further comprising:
generating a tunnel port that forms a tunnel route for a virtual machine that executes the second container; and
second forwarding the duplicated second information forwarded and destined for the second port to the tunnel port, wherein
the tunnel port transmits the duplicated second information forwarded by the second forwarding, to the virtual machine that executes the second container through the tunnel route.

4. The information processing system according to claim 3, wherein
the second forwarding removes first header information being attached to the duplicated second information and being used in the first forwarding, and forwards the duplicated second information from which the first header information is removed to the tunnel port; and
the tunnel port attaches, to the duplicated second information forwarded by the second forwarding, second header information destined for the virtual machine that executes the second container, and transmits the duplicated second information attached with the second header information to the tunnel route.

5. The information processing system according to claim 3, wherein:
the tunnel port is provided to a virtual switch that controls communication between the plurality of virtual machines; and
the second forwarding of the second information to the tunnel port is executed at a virtual port being provided to the virtual switch and being connectable to the second port of the virtual machine that executes the second container.

6. The information processing system according to claim 1, wherein the first information is transmitted and received between the first container and the second container at a predetermined timing.

7. An information processing apparatus comprising:
a memory that stores association information including a first address of a first container assigned in advance and a second address of a second container assigned in advance in association with each other, the first container and the second container being included in a plurality of containers executed by a plurality of virtual machines; and
a processor coupled to the memory, the processor being configured to execute a procedure comprising:
detecting first information being transmitted from one of the plurality of containers, the first information including at least one address related to specifying of at least one of the plurality of containers executed by at least one of the plurality of virtual machines;
setting, when the address included in the first information matches one of the first address and the second address, one of the first container and the second container including the address matching the address included in the first information and a port of a virtual machine specified by the first information among the plurality of virtual machines in association with each other in the association information;
duplicating second information passing through a first port associated with the first container by referring to the association information; and
first forwarding the duplicated second information destined for a second port associated with the second container.

8. The information processing apparatus according to claim 7, wherein the duplicating duplicates the second information passing through the first port and transmitted or received between the address included in the first information and an address different from the second address.

9. The information processing apparatus according to claim 7, wherein the procedure is further comprising:
generating a tunnel port that forms a tunnel route for a virtual machine that executes the second container; and
second forwarding the duplicated second information forwarded and destined for the second port to the tunnel port, wherein
the tunnel port transmits the duplicated second information forwarded by the second forwarding, to the virtual machine that executes the second container through the tunnel route.

10. The information processing apparatus according to claim 9, wherein
the second forwarding removes first header information being attached to the duplicated second information and being used in the first forwarding, and forwards the duplicated second information from which the first header information is removed to the tunnel port; and the tunnel port attaches, to the duplicated second information forwarded by the second forwarding, second header information destined for the virtual machine that executes the second container, and transmits the duplicated second information attached with the second header information to the tunnel route.

11. The information processing apparatus according to claim 9, wherein:
the tunnel port is provided to a virtual switch that controls communication between the plurality of virtual machines; and
the second forwarding of the second information to the tunnel port is executed at a virtual port being provided to the virtual switch and being connectable to the second port of the virtual machine that executes the second container.

12. The information processing apparatus according to claim 7, wherein the first information is transmitted and received between the first container and the second container at a predetermined timing.

13. A non-transitory computer-readable recording medium having stored therein an information processing program that causes a computer to execute a procedure comprising:
detecting first information being transmitted from one of a plurality of containers, the first information including at least one address related to specifying of at least one of the plurality of containers executed by at least one of a plurality of virtual machines;
storing association information including a first address of a first container assigned in advance and a second address of a second container assigned in advance in association with each other into a memory, the first container and the second container being included in the plurality of containers executed by the plurality of virtual machines;
setting, when the address included in the first information matches one of the first address and the second address, one of the first container and the second container including the address matching the address included in the first information and a port of a virtual machine specified by the first information among the plurality of virtual machines in association with each other in the association information;
duplicating second information passing through a first port associated with the first container by referring to the association information; and
first forwarding the duplicated second information destined for a second port associated with the second container.

14. The non-transitory computer-readable recording medium according to claim 13, wherein the duplicating duplicates the second information passing through the first port and transmitted or received between the address included in the first information and an address different from the second address.

15. The non-transitory computer-readable recording medium according to claim 13, wherein the procedure is further comprising:
generating a tunnel port that forms a tunnel route for a virtual machine that executes the second container; and
second forwarding the duplicated second information forwarded and destined for the second port to the tunnel port, wherein
the tunnel port transmits the duplicated second information forwarded by the second forwarding, to the virtual machine that executes the second container through the tunnel route.

16. The non-transitory computer-readable recording medium according to claim 15, wherein
the second forwarding removes first header information being attached to the duplicated second information and being used in the first forwarding, and forwards the duplicated second information from which the first header information is removed to the tunnel port; and
the tunnel port attaches, to the duplicated second information forwarded by the second forwarding, second header information destined for the virtual machine that executes the second container, and transmits the duplicated second information attached with the second header information to the tunnel route.

17. The non-transitory computer-readable recording medium according to claim 15, wherein:
the tunnel port is provided to a virtual switch that controls communication between the plurality of virtual machines; and
the second forwarding of the second information to the tunnel port is executed at a virtual port being provided to the virtual switch and being connectable to the second port of the virtual machine that executes the second container.

18. The non-transitory computer-readable recording medium according to claim 13, wherein the first information is transmitted and received between the first container and the second container at a predetermined timing.

* * * * *